United States Patent [19]
Koschmann et al.

[11] Patent Number: 5,189,484
[45] Date of Patent: Feb. 23, 1993

[54] LASER BEAM DETECTOR FOR GRADE ELEVATION MEASUREMENT

[76] Inventors: Eric C. Koschmann, 8483 Mattituck Cir., Orlando, Fla. 32829-8535; Mark E. Taylor, 821 Orangewood Dr., Oviedo, Fla. 32765; Carroll D. Lifer, 5941 Ankneytown Rd., P.O. Box 309, Bellville, Ohio 44813

[21] Appl. No.: 744,442

[22] Filed: Aug. 13, 1991

[51] Int. Cl.⁵ ............................................. G01B 11/00
[52] U.S. Cl. .............................. 356/138; 33/293; 33/294; 250/208.2; 356/375; 356/400; 356/152
[58] Field of Search .............. 356/138, 399, 400, 375, 356/152; 33/293, 294, 296; 37/DIG. 20; 172/4.5; 250/208.2

[56] References Cited
U.S. PATENT DOCUMENTS

| | | |
|---|---|---|
| 2,796,685 | 6/1957 | Bensinger . |
| 2,916,836 | 12/1959 | Stewart et al. . |
| 3,000,121 | 9/1961 | Martin et al. . |
| 3,887,012 | 6/1975 | Scholl et al. . |
| 3,894,230 | 7/1975 | Rorden et al. . |
| 4,162,708 | 7/1979 | Johnson . |
| 4,200,787 | 4/1980 | Carson . |
| 4,273,196 | 6/1981 | Etsusaki et al. . |
| 4,537,259 | 8/1985 | Funabashi et al. . |
| 4,693,598 | 9/1987 | Sehr ........................................ 33/293 |
| 4,718,171 | 1/1988 | Schlemmer et al. ................. 33/293 |
| 4,820,041 | 4/1989 | Davidson et al. .................... 172/4.5 |
| 4,829,418 | 5/1989 | Nielsen et al. . |
| 4,895,440 | 1/1990 | Cain et al. . |

*Primary Examiner*—F. L. Evans
*Attorney, Agent, or Firm*—Julian C. Renfro

[57] ABSTRACT

This laser beam detector system may comprise an array of photodetectors usable in conjunction with a laser employed to define an elevation or grade. The detector array is utilized on an elongate device having a plurality of faces, with a plurality of detectors disposed in a consistently spaced arrangement on each of the faces. The detectors of each face have a field of view different from the field of view of the detectors of the other faces, and each detector on each face of the array is disposed at the same height as a corresponding detector on each of the other faces. Importantly, each group of detectors at the same height are electrically interconnected into a co-functioning group. Our novel arrangement is such that a laser beam incident on any detector of a co-functioning group is detected, with the position of the detector upon which the beam impinged being identified, and a readout indicative of that detector then provided. Such readout is conveniently in the form of a plainly visible representative character.

20 Claims, 9 Drawing Sheets

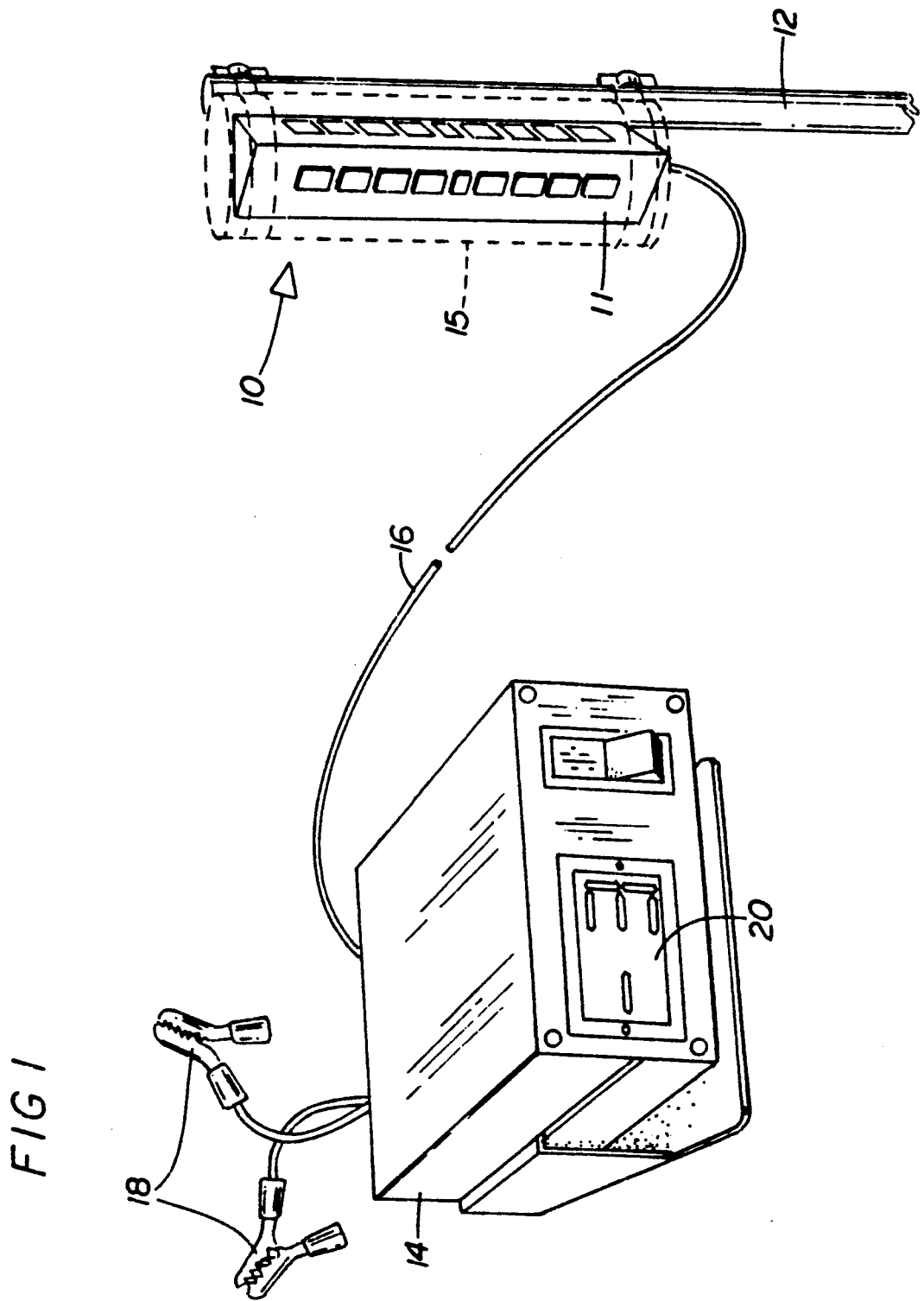

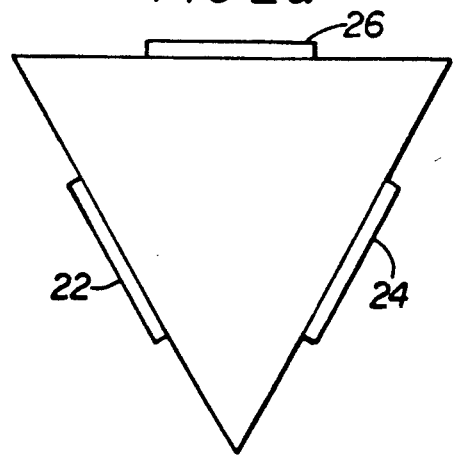
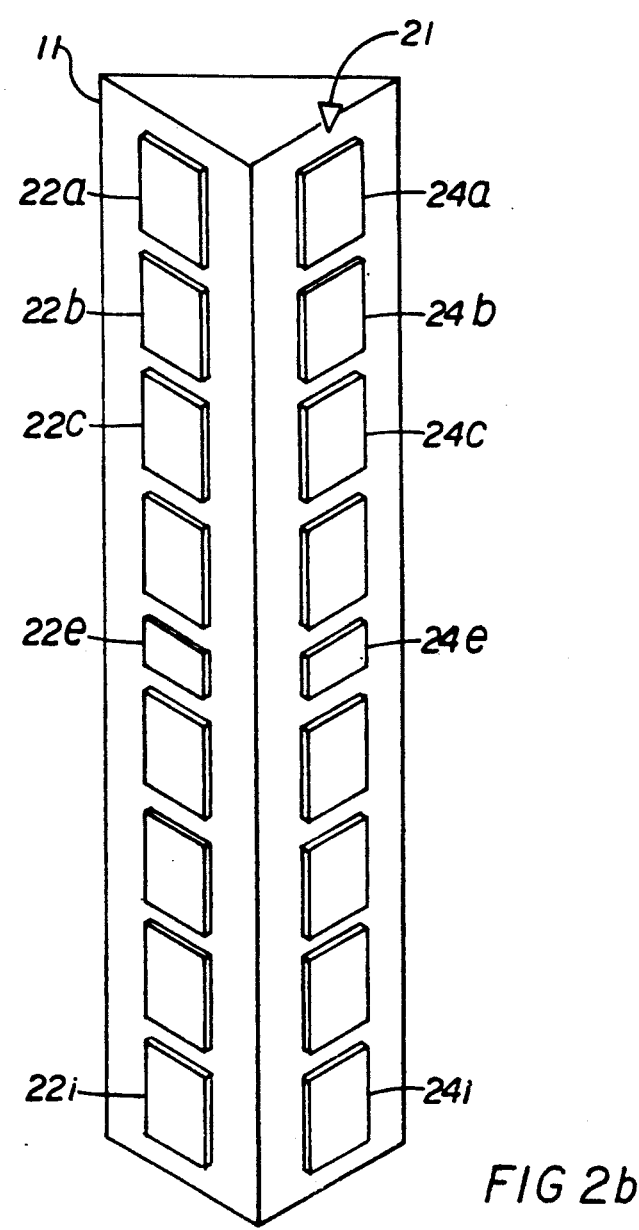
FIG 2a
FIG 2b

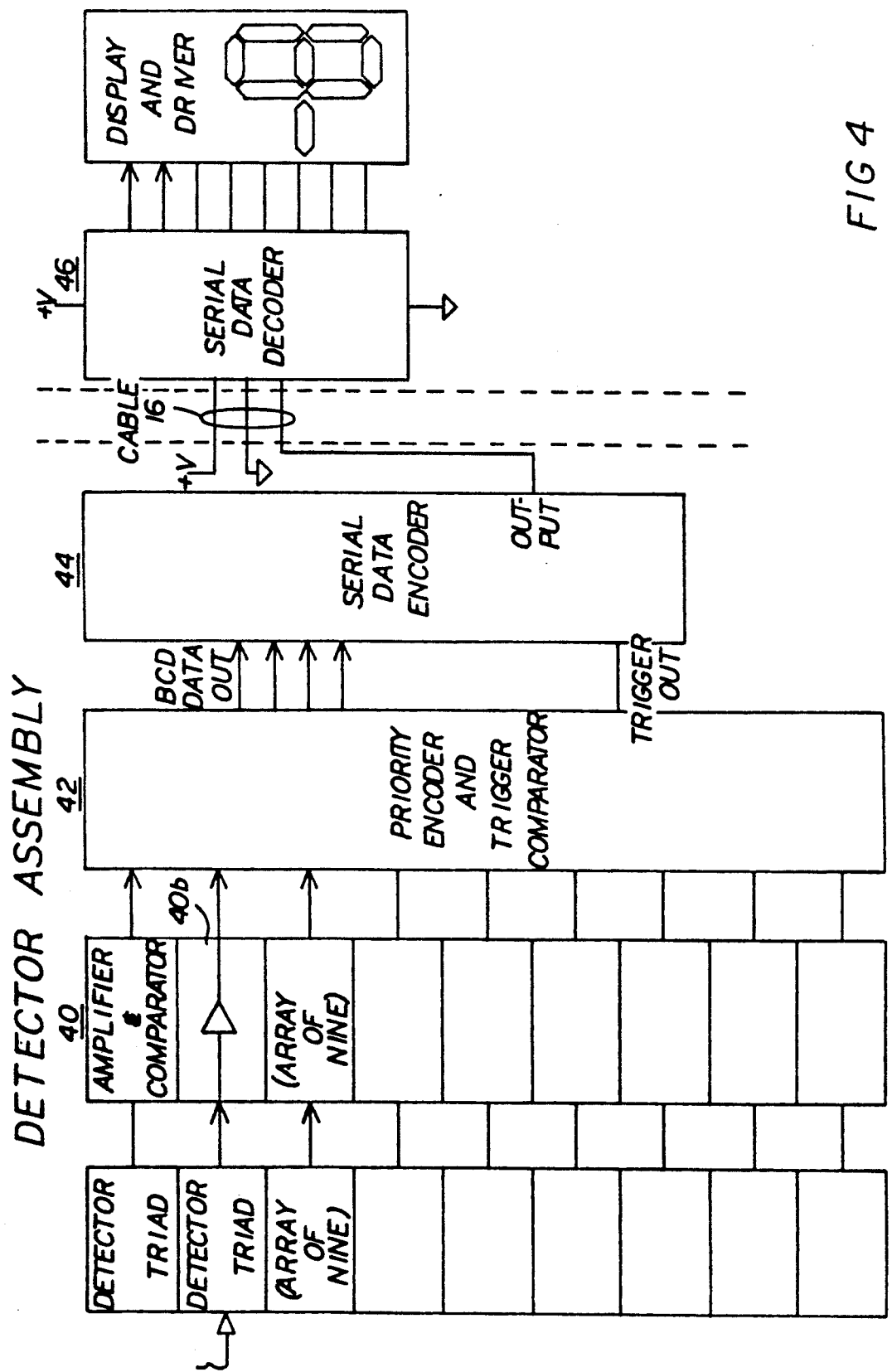

LASER BEAM DETECTOR FOR GRADE ELEVATION MEASUREMENT

BACKGROUND OF THE INVENTION

At the present, the construction industry is using scanning LASER beams for a level and/or grade reference during many phases of the construction process. For example, when a lot is being prepared, it must be formed to the specified grade and slope before a foundation or road bed is laid. A laser beam, which travels in an ideal straight line, can be rotated about 360° to form a plane that can have the proper slope. An optical detector can sense this laser beam and thus instruct a machine or operator that the land is being graded at the proper level and slope, or else that the blade of the grader must be adjusted in a certain manner.

This is presently accomplished using a set of detectors that is so arranged to detect when the laser beam is at the correct level, or whether it is too high or low. There are then three indications to the operator: one that indicates that the beam is too high, one that indicates that the beam is too low, and one that indicates the proper elevation.

Due to this limited feedback system, the operator does not know how far above or below the proper grade level the blade of the equipment is operating. In other words, the system is qualitative, no quantitative.

Also, to account for sloped grades, such as are used in parking lots and on roads for water drainage, the laser beam is tilted to accomplish this purpose. Then, in accordance with prior art techniques, two separate detectors are used, one on each end of the grader's blade. Therefore, once the laser and detectors are set, the grading machine can only operate in one direction. If the operator needs to turn around or grade in a different direction the laser and detectors must then be readjusted to accomplish this.

Inasmuch as the instant invention has application, for example, to an apparatus for automatically controlling a blade of earth working equipment such as a bulldozer, the following patents are being made of record:

U.S. Pat. No. 2,796,685 to Bensinger discloses a method for controlling the position of certain construction equipment by forming parallel radiation energy planes and automatically controlling the position of equipment in accordance with deviation from the energy planes.

U.S. Pat. No. 2,916,836 to Stewart discloses a method according to which a reference plane is formed by rotating a visible radiation source and detecting light by a light receiving device attached to a blade for controlling the blade by means of a motor or a hydraulic system using an electromagnetic valve.

U.S. Pat. No. 3,000,121 to Martin discloses a system for automatically controlling the blade of construction equipment in a vertical direction in which a reference plane is formed by a light beam and a light receiver is provided for detecting whether the center of the light receiver coincides with the center of the reference light beam and emitting a signal of a different polarity depending upon whether the center of the reference light beam is above or below the center of the light receiver.

U.S. Pat. No. 3,887,012 to Scholl et al discloses a circuit for controlling an earth working equipment which, in a device having a certain relation with a plane formed by narrow rotating beam of radiant energy of a fixed wavelength, a receiver has at least three channels and a light receiving element cathodes a light beam incident from all directions within 180° or 360° thereby to control the earth working equipment so that the light receiving element catches the light beam at its center.

In the Scholl et al patent, the patentees indicate nine distinct areas in their detector housing, but they are not using the nine areas in a quantitative manner. The center area has no detector in it, therefore actually eight detector sections are used. Due to this type of construction, a loss of laser detection would, quite unfortunately, not be noticed.

The detectors are connected in such a manner that the Scholl et al invention would have a very limited useful range, and saturation from the sun would pose a problem. The circuitry employed is overly complicated, and, although the present state of the device is indicated to the operator, it unfortunately does not indicate where the grader's blade is in relation to the reference beam.

Scholl et al mention that the reason for converting the detector's signals into digital form was for enhanced reliability and noise immunity. Then they convert the signals back to an analog voltage to control the position of the hydraulic valve, which would potentially be subject to noise errors.

The Carson U.S. Pat. No. 4,200,787 relates to an apparatus for sensing the location of a received beam of light, and includes a plurality of optical fibers, each having a receiving end and a terminal end. The receiving ends of the fibers are arranged in a predetermined pattern over a light reception area, and with the terminal ends arranged to direct the light that is received to a plurality of phototransducers for detection of the light beam.

Carson's sensor head, which holds the receiving ends of the optical fibers, includes a transparent plastic cylinder disposed on his earth moving machine in a substantially vertical orientation.

The light reception area is divided into a number of separate regions and the fibers for each such region are grouped together into separate fiber bundles, which in turn transmit received light to a separate phototransducer. By this technique, receipt of the light beam by any single fiber in a given region is detected by a single phototransducer, thereby permitting a relatively small phototransducer to detect received light over a much larger area.

The Carson invention is stated to be particularly useful in a system for controlling the elevation of the cutting blade of an earth moving machine, and can be used in combination with a rotating laser beam transmitter operative in fixed relation to the ground.

The Nielsen et al U.S. Pat. No. 4,829,418 teaches a method and apparatus for controlling an excavator to position the cutting edge, during a cut, to a desired depth. That invention is used in conjunction with a laser plane generator that generates a laser plane and which repetitively calibrates the reference coordinate system of the excavator every time a digging stick passes through the laser plane. In that manner, the control will be frequently and repetitively calibrated as the excavator hauls bucket-loads of dirt out of the ditch and will thus compensate for frequent movement of the excavator frame without requiring time-consuming re-establishment of the frame location.

The Nielsen invention is noted to utilize a control technique for controlling the cutting edge in relationship to the angular relationship between the various members of the excavator, and is stated to provide a very accurate determination of the position of the cutting edge, and to be capable of digging to a non-level grade as well as to a level one.

According to Nielsen, his control has means for monitoring the angle of displacement of the excavator from a vertical plane and the various angles between the members of the excavator and means for determining the position of the bucket cutting edge from these angles. A laser receiver is mounted on the stick member and is passed through the laser plane every time the stick is brought out of or put into a trench. The control determines the position of the laser receiver with respect to the excavator frame at the precise moment that the receiver detects the laser beam. This information is used to determine the location of the excavator frame with respect to the laser beam. The position of the bucket cutting edge with respect to the laser plane can therefore be accurately determined and is compared to a desired cutting distance with respect to the laser plane to operate the means that actuates the cutting edge.

Unfortunately, the Nielsen device is extremely complicated and expensive. The cost of such a device is beyond the reach of smaller excavating contractors, whereas our invention is easy to use and readily affordable.

It was to overcome the substantial disadvantages of these highly complex prior art arrangements that the present invention was evolved.

SUMMARY OF THE INVENTION

A detector system in accordance with this invention comprises two main parts: a detector array assembly, and an indicator readout device. This novel system is intended for use with grade levelling equipment, or as a surveying device, for example, but we are not to be limited to either of these.

As will hereinafter be described in some detail, we prefer for our novel detector array to have at least three faces, and utilize a number of laser detector cells, such as nine, with the center detector of each face being used for detecting when the operator has set the machinery to be operating at the desired grade. There may be, for example, four detectors above and four detectors below the center cell of each face, with all of the cells being spaced in an appropriate center-to-center relationship to each other.

Importantly, the corresponding detectors of each of the multiple faces are disposed at precisely the same level, which is to say in the preferred embodiment now to be described, which utilizes three faces, that there is a triad of detectors operatively interconnected in a co-functioning group at each of the nine or so levels of the detector array.

Initially, the detector assembly is positioned so that the triad of center detectors is sensing the laser beam. This is considered on-grade. Then, when the detector assembly moves as a consequence of the machinery being put into operation, the detectors above or below the center detectors as the case may be, will sense the location of the laser beam and indicate in increments of 0.1 foot how far the detector assembly has been moved either above or below the on-grade level laser beam. For example, when detector number −3 is sensing the laser beam, this means that the assembly has moved below the on-grade beam by 0.3 feet.

This information is sent to the digital readout device that indicates to the operator in a quantitative measure, such as in tenths of a foot, the location at which the equipment is operating. The readout could also be graduated in metric units.

It is thus to be seen that a laser beam detector system for grade elevation measurement in accordance with this invention comprises an array of photodetectors usable in conjunction with a beam from a laser employed to define an elevation or grade. The detector array is utilized on an elongate device having a plurality of faces, with a plurality of detectors disposed in a straight, consistently spaced arrangement on each of the faces.

It is to be noted that the detectors of each face have a field of view different from the field of view of the detectors of the other two faces. Each detector on each face of the detector array is disposed at the same height as a corresponding detector on each of the other faces, with each group of three detectors at the same height being electrically interconnected in the aforementioned co-functioning triad arrangement. Means are provided for detecting a laser beam incident on any derector of a triad, and means are provided for identifying the position of the detector in the array, upon which the laser beam has impinged.

Means are also provided for displaying a readout indicative of the detector upon which the laser has impinged. The readout is advantageously in the form of a plainly visible representative character, typically an arabic numeral.

It is therefore a primary object of this invention to provide a multi-faced detector array of highly advantageous construction particularly adapted for use with a laser beam in conjunction with grade elevation measurement, that will furnish more information than is presently available, using conventional techniques.

It is another object of our invention to provide a low cost yet highly advantageous grade elevation measurement technique utilizing novel anti-saturation means enabling our equipment to continue to function in an appropriate manner, even if sunlight is saturating one of the faces of the detector array.

It is still another object of our invention to provide a display means designed to provide a plainly visible character representative of the precise level at which a machine may be operating, thus providing a quantitative readout of grade.

It is yet another object of our invention to provide a multifaced detector of low cost, usable in a highly effective manner in conjunction with a laser, irrespective of other machines using the same laser at the same time.

It is yet still another object of our invention to provide for the transmission of laser detected information serially, therefore necessitating only a single wire for communication between the detector assembly and the display device, with attendant low cost.

It is yet still another object of this invention to use a programmable array logic circuit that simultaneously decodes the serial data and outputs the required signals to display the information in the form of an arabic numeral, thus to accomplish serial data conversion and display decoding in one chip or integrated circuit.

These and other objects, features and advantages will be more apparent as the description proceeds.

BRIEF DESCRIPTION OF DRAWINGS

FIG. 1 is a somewhat simplified version of our invention, this figure depicting a preferred detector array component, as well as a typical readout device;

FIG. 2a is a top view of the preferred embodiment of our novel multifaced detector array, in this instance a three-sided array;

FIG. 2b is a perspective view to a slightly smaller scale of the preferred embodiment of our multifaced detector array, this view indicating that the plurality of detectors located at each level are connected in the manner we call a triad arrangement.

FIG. 4 is a physical block diagram representative of our invention, this figure depicting typical detector array components as well as the indicator readout assembly, and revealing relationships of consequence to a proper understanding of our invention;

DETAILED DESCRIPTION

Figure 3A:
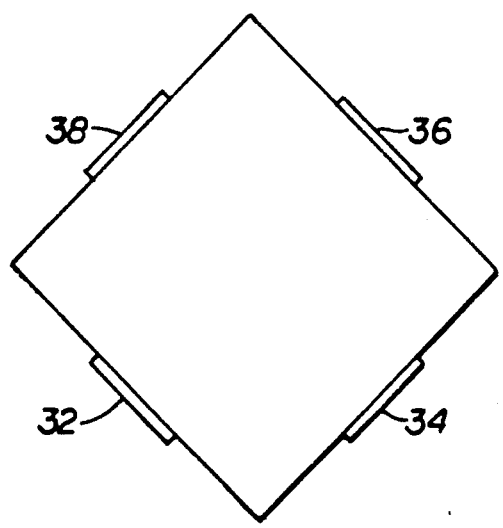
FIG. 3a is a top view of another embodiment of our invention, in which a quad detector array is used.

With initial reference to FIG. 1, it will be noted that in this preferred embodiment we have shown a detector assembly 10 in accordance with this invention, which is supported at an appropriate location by a pole 12 or the like. The detector assembly 10 includes a housing 11 and a plurality of photo-diodes, with housing 11 containing a highly advantageous electronic coding assembly. The housing 11 is encapsulated in a plastic tube 15, and is connected by electrical cable 16 to the display box 14. The plastic tube 15 is transparent to a laser beam.

The cable 16 is equipped with three wires or leads, with two of such wires or leads being utilized for the transmission of power to the detector circuit from a suitable source, such as the vehicle's battery, with the third wire or lead being used for the transmission of serial data encoded by the electronic coding assembly from the detector circuit to the display circuit.

It is to be understood that in accordance with this invention, grade level information detected by our detector assembly 10 is transmitted in serial form over the third wire or lead of the cable 16 to the display circuitry contained in display box 14, with this grade level information thereafter advantageously being displayed in digital form in the window 20.

It will be seen in FIG. 1 that we may utilize clip leads 18 on the two wires or leads concerned with supplying voltage to the detector circuit, making it readily possible to obtain electrical power from the construction vehicle's batter, as was mentioned earlier, or from some other convenient source.

With reference now to related FIG. 2a and 2b, we there show a preferred form of detector array assembly 21, which represents a minimal cost embodiment. The assembly of FIG. 2a is made up of three interrelated silicon photo-diode arrays, designated 22, 24 and 26. We are not to be limited to an array having three faces, for as discussed hereinafter, we could use a four face or a five face detector array, but in the preferred embodiment, we are utilizing three faces.

FIG. 2b makes clear that each photo diode array is disposed on a separate face of the detector assembly, with each face of this exemplary array being in a 120° relationship to the other two. Because each detector located at each level of the assembly 21 is connected to the same amplifier as the other two detectors at the same level, this arrangement advantageously enables the detector assembly to detect a laser beam coming from any direction.

It is to be seen from FIG. 2b that nine detector cells, 22a through 22i, are used on one visible face, and nine detector faces 24a thru 24i are used on the other face visible in FIG. 2b. We usually prefer for middle cells 22e, 24e and 26e to be one-half the size of the other eight detectors of the array, so that the on-grade sensing in accordance with this invention is more accurate than that of the other cells. As an example, the center-to-center spacing of the eight large detectors is 0.1 foot, whereas the center-to-center spacing from each middle cell to the two large adjacent cells is 0.075 foot. Therefore, the on-grade or "0" level is accurate to ±0.025 of a foot, whereas the accuracy of detected position from the other cells is ±0.05 of a foot.

It is important to understand that, as previously mentioned, the corresponding detectors of each of the faces 22, 24 and 26 are disposed at precisely the same level, which is to say that there is a triad of detectors operatively disposed as a co-functioning group at each of the nine or so separate levels or locations of each detector array depicted in FIG. 2b. It is to be noted that each silicon photodiode is individually reverse biased, which allows each of the photodiodes to respond very quickly to the laser beam emanating from the source utilized at the construction site. We are manifestly not to be limited to any particular type of laser source, but usually a red HeNe laser is preferred.

Figure 3B:
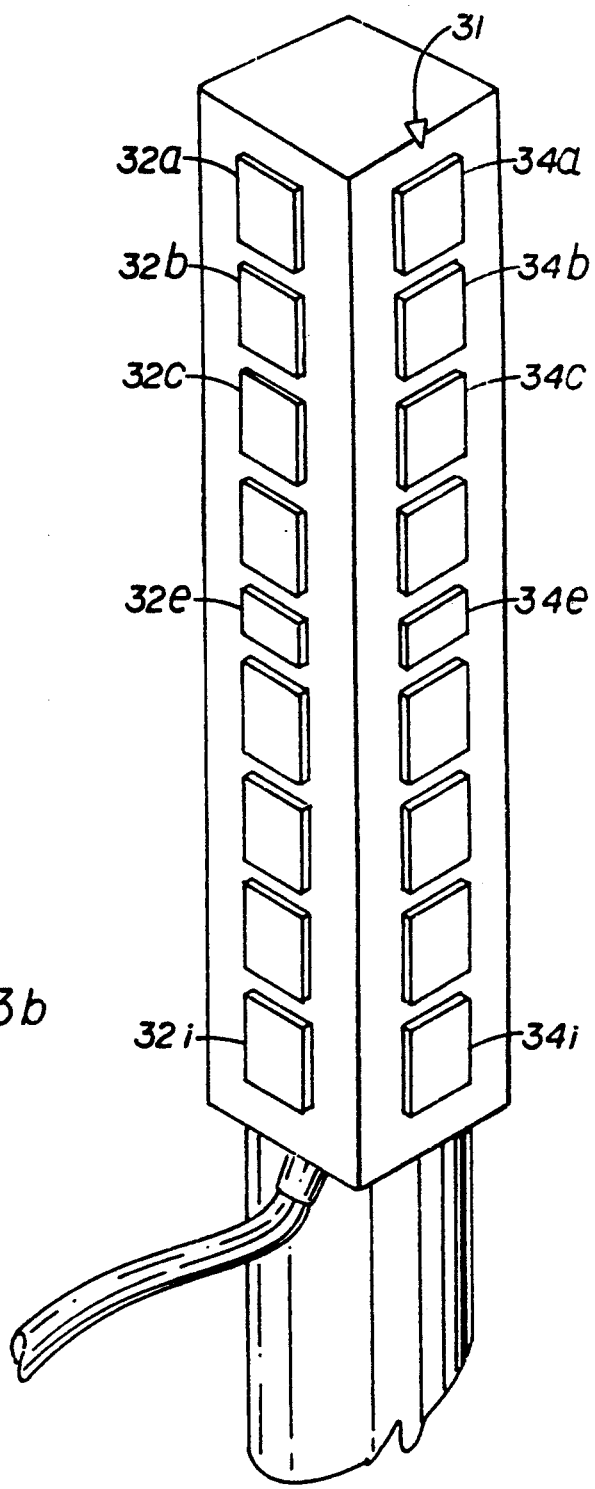
FIG. 3b is a perspective view of our four-sided array.

With reference to FIGS. 3a and 3b, it will there be seen that we have illustrated a four sided detector array 31, representing a secondary embodiment of our invention. This figure shows that the detectors utilized on each of the four faces are disposed in a 90 degree relationship to the detectors on the two adjacent faces. This figure also makes clear that each detector on each of the four faces is disposed at precisely the same level as the corresponding detectors on the other three faces, and interconnects as a co-functioning group to form a highly advantageous quad arrangement. The detector assembly shown in FIGS. 3a and 3b operate in a similar fashion to the three-sided detector assembly of the preferred embodiment, except that the detectors of the three-sided embodiment need a field of view of 120 degrees, whereas the detectors of the four-sided embodiment need a field of view of 90 degrees to accomplish omnidirectional detection of the laser beam.

It is thus to be understood that each detector on each face of either detector array corresponds to a particular level or position connected to the same amplifier. In the particular instance illustrated in the block diagram of the electric coding assembly depicted in FIG. 4, an incoming laser beam is being assumed to be impinging upon detector 22b, with the output of this detector (actually the output of the triad of detectors located at this level), being connected to the appropriate amplifier and comparator 40 as depicted in FIG. 4. In the interests of clarity and simplification, only a single amplifier and comparator is illustrated in this figure, but the overall relationships of the several amplifiers and comparators is made clear in certain other figures of drawing.

Initially, the detector assembly is positioned so that the detectors in the center of the visible faces of the assembly are sensing the laser beam. This is considered on-grade. Then, when the detector assembly moves as a consequence of the machinery being put into operation, the detectors above or below the center detectors as the case may be, will sense the location of the laser beam and indicate in increments of 0.1 foot how far the detector assembly has been moved either above or below the on-grade level laser beam. In this particular example, when detector number 22b of FIG. 2b is sensing the laser beam, this means that the assembly has moved below the on-grade beam by 0.3 feet.

The amplifier comparator 40b corresponding to detector 22b sends the appropriate signal to the priority encoder and trigger comparator 42, as depicted in FIG. 4. The trigger comparator then causes the serial data encoder 44 to load the information from the priority encoder.

At this point the serial data encoder 44 changes this information into serial data that is to be transmitted along the cable 16 to the serial data decoder 46 located in display box 14. The decoder then interprets this information so that the display driver and the display means indicate the aforementioned −3.

Figure 5A:
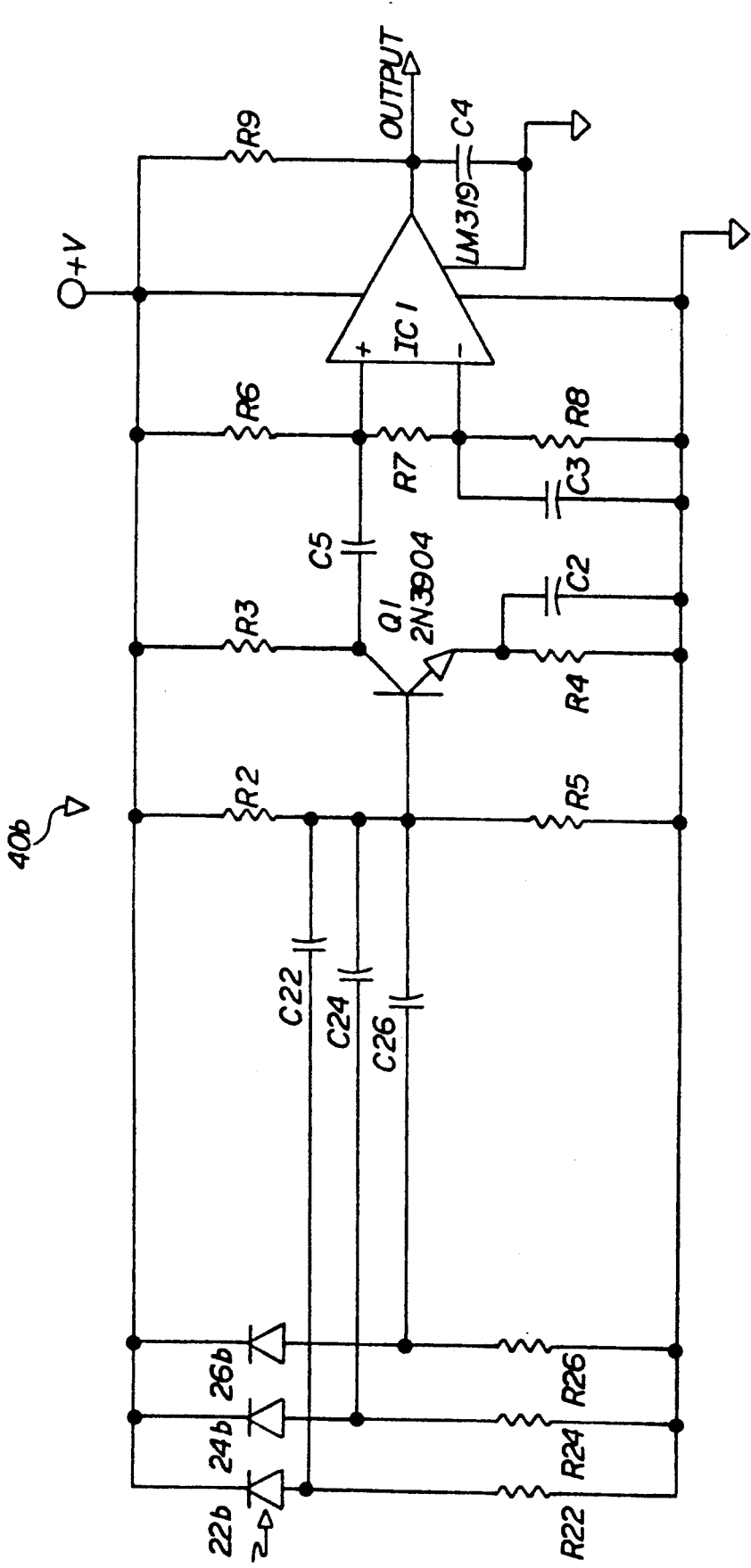
FIG. 5a is a schematic of a channel amplifier and comparator of the type we prefer for use with arrays of the type shown in FIGS. 2a and 2b, wherein detectors are utilized in groups of three.

With regard to a more detailed consideration of our invention, reference is now made to the channel amplifier and comparator 40b illustrated in FIG. 5a, which is the triad version of our invention, and which is supplied with a regulated voltage source +V of say 10 volts. Conventional laser beam sources scan in a circle, so the laser beam impinges for a brief moment upon a given detector. In the assumed instance, this is detector 22b of a particular triad, as depicted in FIG. 5a. As a result of the impingement of the laser beam, the detector's impedance changes, causing a current pulse. As will be understood from FIG. 5a, this pulse is transferred to the base of transistor Q1 via capacitor C22. The circuit comprising components Q1, R2, R3, R4, R5 and C2 form an inverting amplifier, which amplifies and converts the current pulse into a voltage pulse that is usable by the high-speed comparator IC1, which may be of the LM319 type.

It is to be noted that it is possible for one or more of the cells of a particular triad to be pointed in the direction of the sun and saturate, that is, can no longer detect a laser beam. Quite advantageously, the other cell or cells of each triad of our device are still active in this instance, and can still detect the laser beam. With reference to FIG. 5a, this is accomplished by individually reverse biasing each photodiode 22b, 24b and 26b of the triad using resistors R22, R24 and R26; and electrically connecting the photodiodes to the amplifier via separate capacitors C22, C24 and C26. It is to be understood that if one detector saturates, its saturation voltage is blocked by its corresponding capacitor from interfering with the operation of the other photodiodes. We regard this novel anti-saturation means as representing a major improvement of our invention over the existing art.

The negative-going voltage pulse, which appears at the output of capacitor C5, is applied to the positive input of the comparator IC1. When this occurs, the output of the comparator goes to a low voltage condition. This has the effect of converting the analog voltage pulse into a digital pulse, which appears on the Output lead of IC1. It is important to note that if the laser beam had struck either of the other detectors of the triad involving detectors 22b, 24b and 26b, the result would have been the same.

Although we are not to be limited to any particular values of resistors and capacitors, the values of the components we utilized in the preferred embodiment shown in FIG. 5a are as follows:

| Resistor Values | Capacitor Values |
|---|---|
| R2 - 68K | C2 - 0.1 μF |
| R3 - 3.3K | C3 - 0.1 μF |
| R4 - 3.3K | C4 - 0.001 μF |
| R5 - 33K | C5 - 0.01 μF |
| R6 - 100K | |
| R7 - 3.3K | |
| R8 - 100K | |
| R9 - 1K | |
| R22 - 1K | C22 - 0.1 μf |
| R24 - 1K | C24 - 0.1 μf |
| R26 - 1K | C26 - 0.1 μf |

Figure 5B:
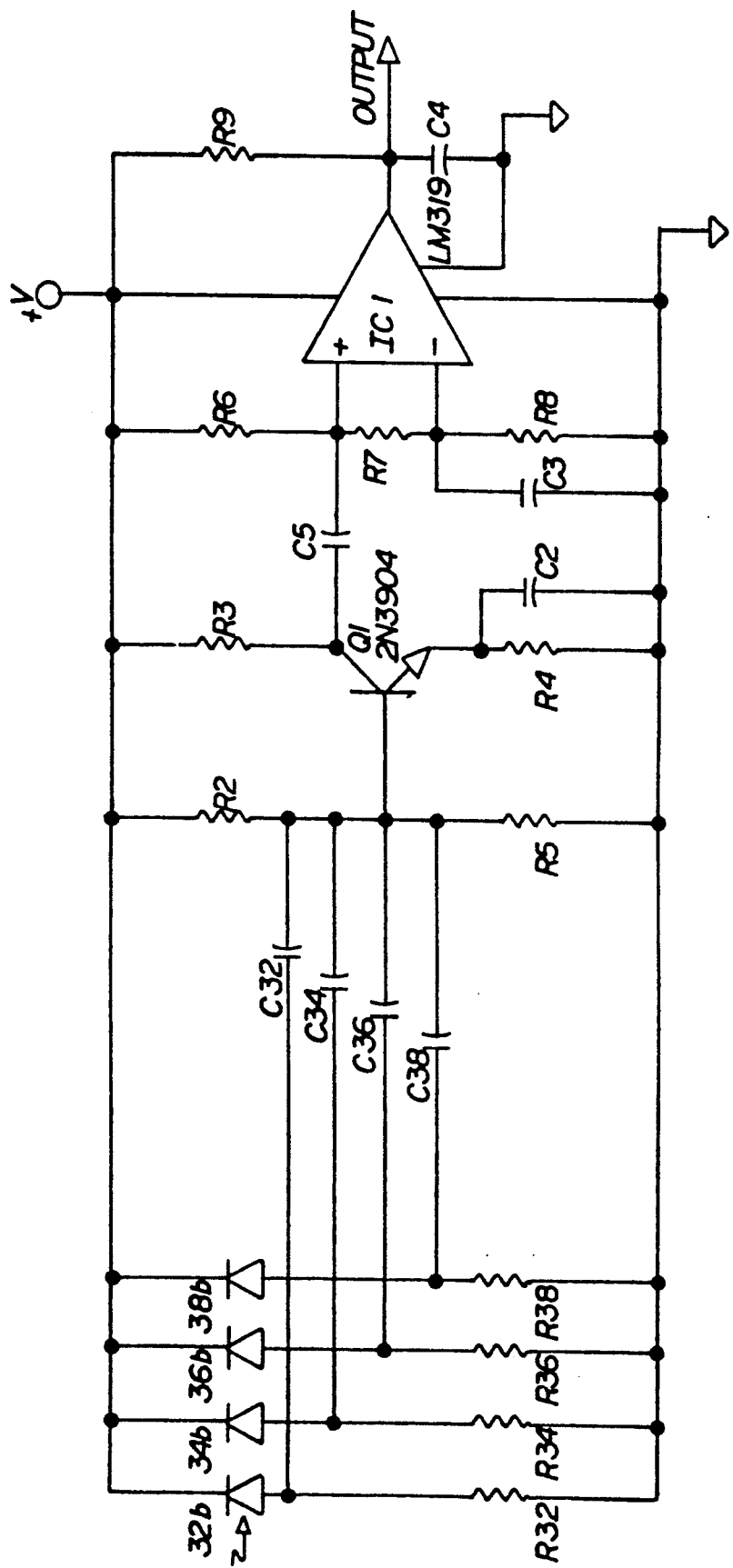
FIG. 5b is a schematic similar to FIG. 5a, but showing a channel amplifier and comparator for use with arrays of the type shown in FIGS. 3a and 3b, wherein detectors are utilized in groups of four.

With regard to FIG. 5b, it will there be seen that we have shown the channel amplifier and comparator circuitry associated with the utilization of a four sided detector array. It will be noted that the circuitry of FIG. 5b is quite similar to the circuitry of FIG. 5a utilized in conjunction with the three sided detector array, with like numbered components being identical in construction and function.

It is to be understood that all four detectors located at a common level of the four-sided detector array are connected to the corresponding amplifier and comparator, using the aforementioned anti-saturation technique. In this manner, when any of the four detectors at a given level are impinged upon by a laser beam, a current pulse is generated that is amplified and then sensed by the high speed comparator, this being accomplished in the same manner as was described in the preferred embodiment. For example, resistor R38 can be identical with resistors R32, R34 and R36, and can have one thousand ohms. Capacitor C38 is the same as capacitors C32, C34, and C36, and can have a value of 0.1 micro-Farads.

As should now be clear, the obvious distinction of FIG. 5b over FIG. 5a involves the use of four detectors 32b, 34b, 36b and 38b; four resistors R32, R34, R36 and R38; and four capacitors C32, C34, C36 and C38.

Figure 6:
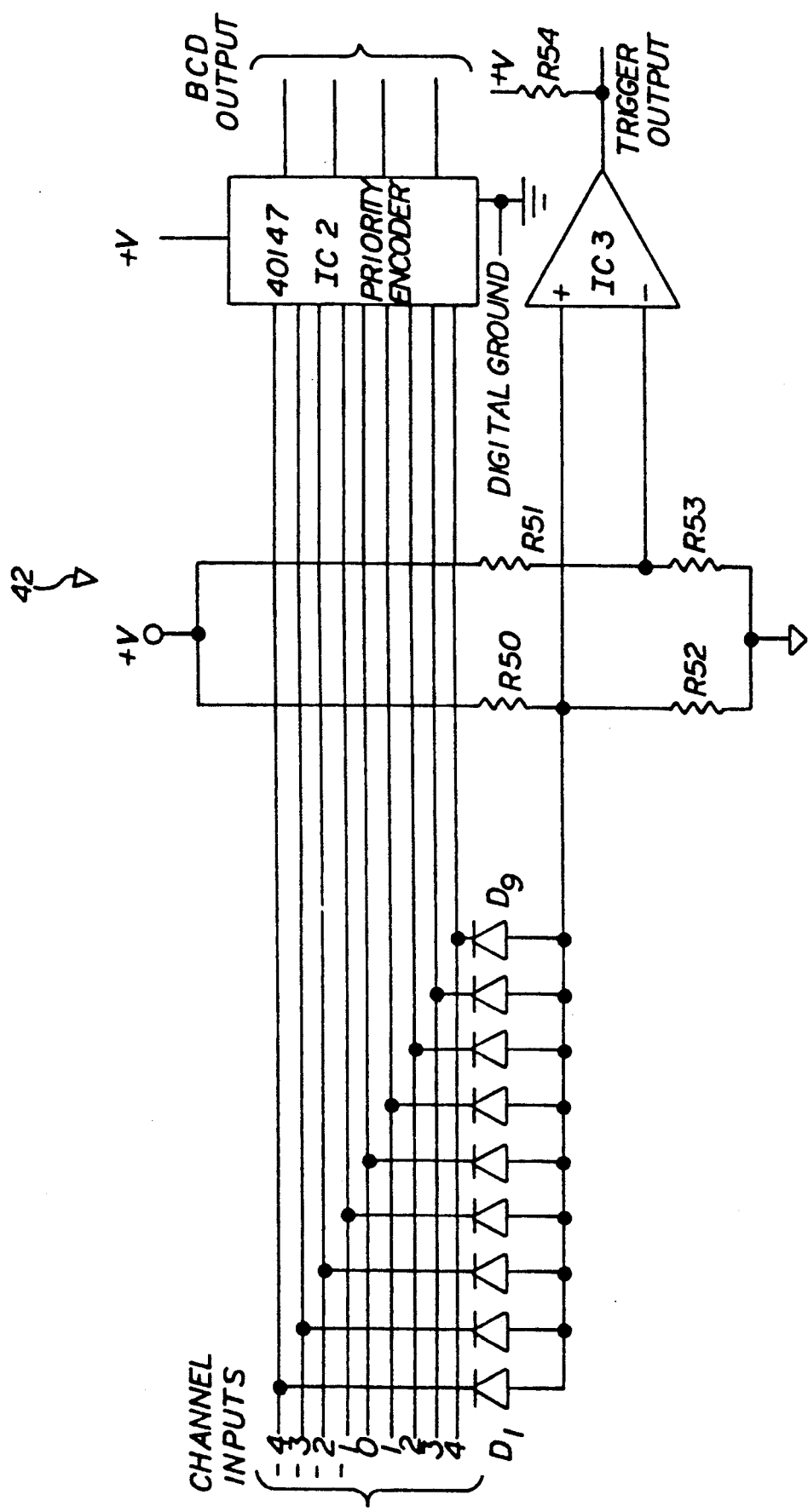
FIG. 6 is a schematic of the priority encoder and trigger comparator of the type we use with our detector, amplifier and comparator arrays.

With reference now to the priority encoder and trigger comparator of FIG. 6, each channel's comparator output is connected to a priority encoder IC2, which may for example be of a type 40147, and to a trigger comparator. In the preferred embodiment, the trigger comparator comprises nine diodes, D1 through D9, that create a Boolean OR gate, and IC3, a high-speed comparator. This high-speed comparator may be of the LM319 type.

It is to be noted that when any of the channel comparators output a pulse, the trigger comparator detects this and generates a trigger pulse. For example, when as in the previously assumed case, the laser beam impinged upon detector 22b, the −3 channel input was pulled low by the aforementioned comparator output, causing the positive input of comparator IC3 to go low, via diode D2. When this occurs, the output of the comparator IC3 goes to a low voltage level or condition.

At this same time, this signal is converted to a binary coded decimal equivalent (BCD) by the priority encoder IC2, that is to say, a number 1 through 9, that indicates which channel or triad of detectors is detecting the laser beam. For the purposes of our illustrated example, this corresponds to a BCD output of 2.

Although we are obviously not to be limited to any particular component values, in the embodiment illustrated in FIG. 6, R50 has a value of 510 Ohms, whereas R51, R52 and R53 each have a value of 1 K Ohm, R54 has a value of 4.7 K ohms, and diodes D1 through D9 are of the IN4148 type.

Figure 7:
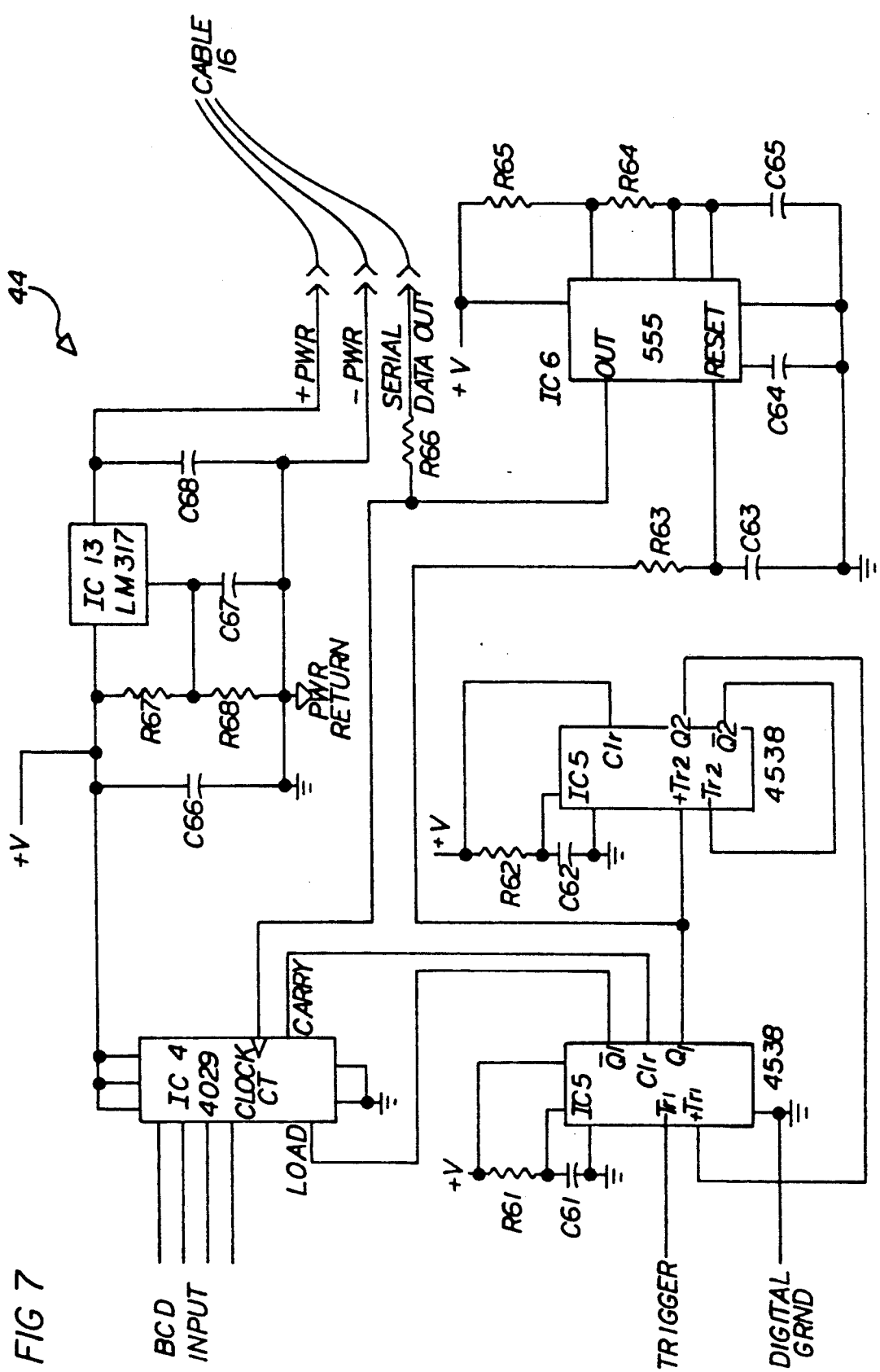
FIG. 7 is a schematic of the preferred type of channel data serial encoder.

With reference now to the channel data serial encoder depicted in FIG. 7, it will be noted that the BCD output from FIG. 6 is connected as the BCD input to counter IC4, and the trigger output from comparator IC3 is connected to the trigger lead of the one shot IC5. The trigger pulse on the trigger lead of IC5 causes it to generate the load command from its $\overline{Q}_1$ output, which in turn causes the BCD number to be loaded and latched into a decimal up-down counter IC4. The component IC5 may be of type 4538, whereas IC4 may be a component of type 4029.

With regard to our previously assumed example in which the laser beam impinged upon the detector 22b, an example of the operation of this aspect of our invention is as follows.

The BCD number 2 (from the previous example) is latched into the counter IC4. The $Q_1$ output of IC5 goes to a high state that removes IC6 from a reset condition, so that IC6 generates a pulse on its output lead, which is transmitted as Serial Data Out along cable 16. It also causes IC4 to decrement by 1, so that IC4 now holds the BCD number 1. It is to be understood that IC6 will periodically generate a pulse of this nature until such time as IC4 reaches the BCD count of zero.

Upon IC4 reaching this zero count, it generates a "CARRY" signal, which clears IC5 When this happens the $Q_1$ output of IC5 causes a reset of IC6, such that there is a cessation of pulses being generated.

Figure 8:
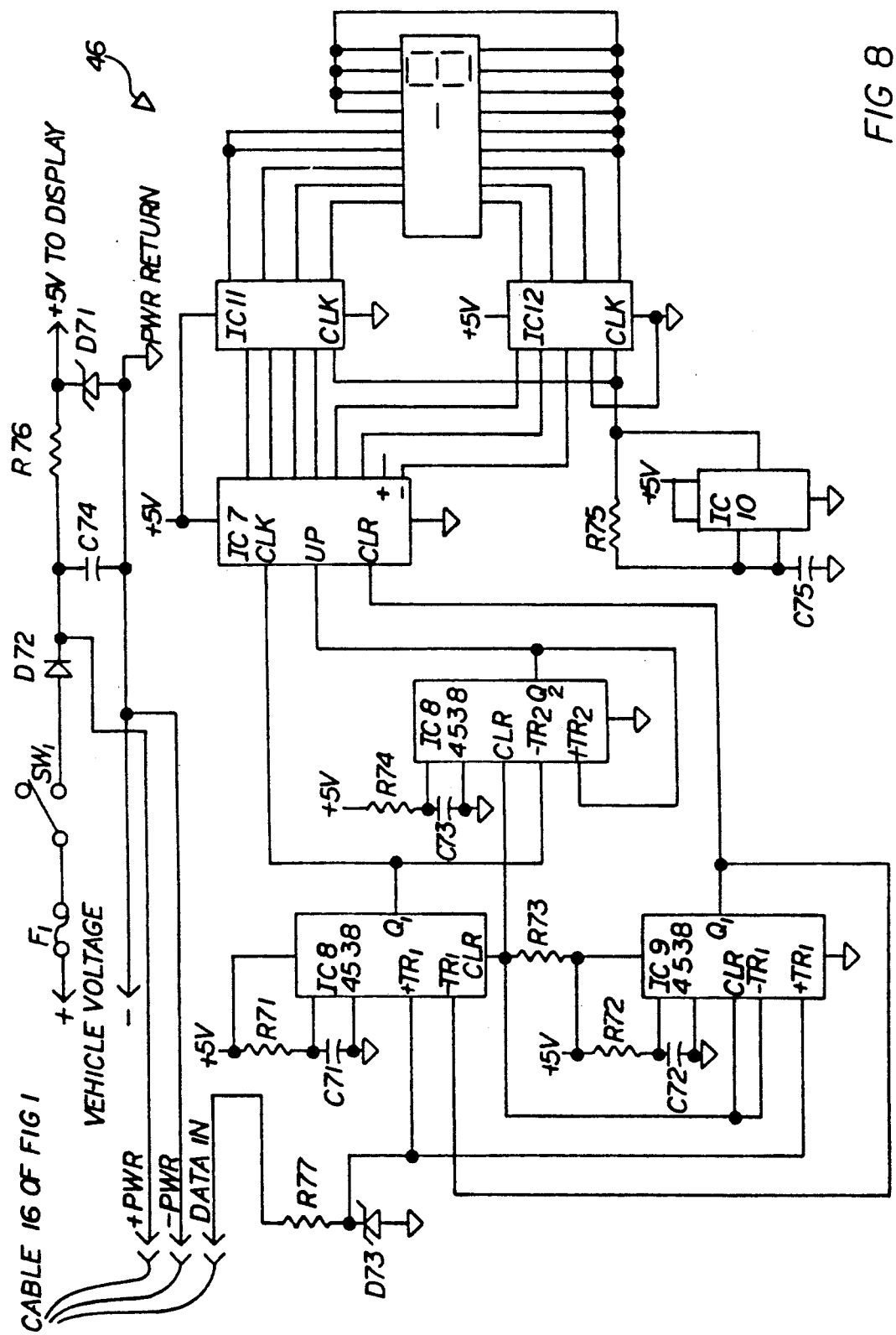
FIG. 8 is a preferred configuration of serial data decoder and display driver.

Continuing with the previous example, when IC4 reaches the BCD count of zero, two pulses will have been sent in serial format via cable 16, to the display circuitry of FIG. 8. This aspect of our invention will be discussed in detail hereinafter.

It is important to keep in mind that this serial transmission of data to the display circuitry is one of the significant features of our invention, and it advantageously permits the detector electronics and the display electronics to be separated over relatively great distances using only a three-wire cable, with two wires being utilized for power and one for the serial data in the cable 16 of FIG. 1 of the preferred embodiment. Our advantageous utilization of serial data in this manner is also important from the standpoint that wireless operation is readily possible, for if the detector unit were battery powered, then the data could be transmitted by the use of a conventional radio link.

With continued reference to FIG. 7, integrated circuit IC5 performs the timing functions to enable the serial data conversion. IC6, which may be a 555 timer integrated circuit, generates the clock pulses that IC4 counts, and IC5 starts and stops the countdown sequence. Linear voltage regulator IC13 may be a component of the type LM317, and it takes the input voltage from cable 16, and outputs a regulated 10 volts representing the V+ source utilized by the circuitry of FIGS. 5, 6 and 7.

By now it should be clear that the trigger pulse to IC5 causes it to change state to start the sequence, and when the counter IC4 reaches zero, IC5 stops the sequence. IC5 also serves to prevent the serial data conversion from occurring more than approximately three times per second. When a trigger pulse is received, the $Q_2$ output of IC5 also goes to a high level which prevents extraneous or spurious trigger pulses from interfering with the counting sequence of IC4 by preventing those subsequent pulses from retriggering IC5. It will be recalled that IC5 causes BCD data to be loaded and latched into IC4. This prevention of extraneous pulses is accomplished by connecting the $Q_2$ output of IC5 to the +Tr1 input of IC5, thereby locking out further trigger pulses for ⅓ of a second.

This action also allows for transmission of the serial data to the display electronics to occur no more than three times per second, which is the fastest update rate of the display we wish to permit. Otherwise, a more frequent transmission of data could cause the display to update at the rate beyond the capability of a human operator to properly interpret the displayed data. For example, if the display should toggle between the numbers "3" and "4" at a fast rate, the resultant display could be misinterpreted to be indicating a number "9", which of course would be an erroneous result.

Component values with regard to FIG. 7 which we prefer to utilize, but to which we are not to be limited, are as follows:

| Resistor Values | Capacitor Values |
| --- | --- |
| R61 - 100K | C61 - 0.15 μF |
| R62 - 33K | C62 - 10 μF |
| R63 - 1K | C63 - 0.001 μF |
| R64 - 47K | C64 - 0.01 μF |
| R65 - 51K | C65 - 0.01 μF |
| R66 - 1 K | C66 - 22 μF |
| R67 - 221 ohm | C67 - 0.1 μF |
| R68 - 1.69K | C68 - 22 μF |

With regard to the data decoder and display driver shown in FIG. 8, it will be noted that power coming in from the clip leads 18 of FIG. 1 goes through a fuse F1, for overcurrent protection, then through an on-off switch SW1 followed by a protection diode D72. This diode serves to protect the circuit from the operator inadvertently connecting the clip leads 18 to the battery incorrectly, i.e. the positive and negative leads connected to the negative and positive battery terminals respectively. The filter capacitor C74 removes high frequency noise from the incoming power. The power then goes to cable 16 for transmission to the detector circuitry. Current flows through resistor R76 and zener diode D71, this latter component serving to regulate the voltage to 5 volts for use by the remaining circuitry of FIG. 8. As will be noted, the negative power lead also serves as the return lead for the "data in" line.

With continuing reference to FIG. 8, as the serial data arrives at the display electronics 46 through cable 16, which interconnects the detector circuit to the +Tr1 input of IC8 and IC9, the first pulse triggers the one-shot, IC8, to change states, such that the rising edge of the $Q_1$ output of IC8 resets the programmable logic array chip IC7. The subsequent falling edge of the $Q_1$ output of IC8 triggers the other one-shot of IC8 such that the $Q_2$ output of IC8 now puts a high level on the "UP" input of IC7. IC8 may be of the 4538 type, and IC7 may be of the PAL16R4 type.

All following data pulses also trigger IC8 to generate a pulse of consistent width on its $Q_1$ output, but the $Q''$ output of IC8 does not change state from its high level. IC7 is programmed to count the pulses generated by the $Q_1$ output of IC8, and output the proper signals so that the display can indicate upon which specific position on the detector array the laser was impinging.

The integrated circuit IC9, which for example may be of a type 4538, accomplishes the resetting of the display to a blank if no serial data is detected after a predetermined amount of time, such as after 15 seconds for example, in order to indicate a loss of laser detection. As long as data is being received from the detector assembly, IC9 is triggered to maintain a high level on its $Q_1$ output. If no data has been received after the predetermined amount of time, then IC9's $Q_1$ output will go to a low level changing the status of the clear input on IC7 and triggering IC8 to produce a pulse on IC8's $Q_1$ output. This will cause IC7 to change the display to a blank to indicate that a loss of laser detection has occurred. The other half of IC9 is not used in the preferred embodiment, wherein a liquid crystal display is utilized, but rather the other half is only used if a mechanical display means is utilized.

In passing it should be mentioned that if a mechanical display means is utilized, another function of IC9 is to apply a reset pulse to the display so that the display changes only after the end of the serial data. This prevents the display from continually changing numbers as IC7 is counting.

It is to be understood that the chip IC7 outputs the data in a format that is compatible with a digital display composed of seven segments to indicate an arabic numeral. As seen in FIG. 8, this segment data is sent to two liquid crystal display (LCD) driver chips IC11 and IC12, which may each be a component of type 4054. These two integrated circuits along with IC10, which may be of the 555 type and which forms a square wave oscillator, generate the necessary signals to cause the LCD to display the arabic numeral reflecting which detector received the laser pulse.

We prefer to utilize, but are not to be limited to the following component values with regard to FIG. 8:

| Resistor Values | Capacitor Values |
|---|---|
| R71 - 10K | C71 - 0.1 μF |
| R72 - 1.5M | C72 - 10 μF |
| R73 - 4.7K | C73 - 0.1 μF |
| R74 - 150K | C74 - 22 μF |
| R75 - 270K | C75 - 0.1 μF |
| R76 - 27 ohm | |
| R77 - 1K | |
| Diodes | Fuses |
| D71 - IN4733 | F1 - 0.5 Amp |
| D72 - IN4004 | |
| D73 - IN4733 | |

Advantages and Improvements

This invention overcomes the deficiencies of the prior art by displaying a plainly visible character indicating to the operator how far above or below the grade reference beam the equipment is operating. This invention can preclude the use of tilted laser beams to accomplish different graded slopes when two detectors are used, since the operator can set one side of a blade at grade level, and the other side of the blade at a level above or below grade, as measured in accordance with the teachings of this invention. Therefore, the same laser can, quite advantageously, be used by more than one machine at the same time If tilted lasers are used, this invention advantageously enables operators to grade in opposite directions without having to reset the beam slope.

An example of this is when a road bed is being graded. The road bed has two slopes that the grader must be aware of, the first is the incline of the road, and the second is the slope from the crest of the road to the gutter or shoulder. The laser transit can be set to the angle of the desired incline of the road, while the grader uses two of the described inventions to indicate the road crest and gutter positions. Both detectors are set to the center "on grade position." The detector at the crest will then indicate a "0," while the gutter detector will indicate a negative number according to the slope away from the road's crest In this manner two road graders can properly grade the road bed in opposite directions while using only one laser transit.

Equipment that previously was difficult or impossible to use with the present art, such as ditch diggers and backhoes, can now use a laser for grade reference, since the output of this invention is quantitative. A backhoe, for example, with the present art, can only indicate when the ditch is at the proper grade. There is no indication as to how much deeper the ditch needs to be dug, so it is therefore very easy to dig too deep. With our invention, the operator will know how far he or she is from the proper grade, thus indicating how much deeper the ditch has to be dug to be at the proper grade.

Detector improvements include using individual biasing on the detectors. This allows laser detection even when the sunlight is saturating one of the arrays. Using a serial data link between the detector and display unit significantly simplifies the interconnection of the two units, and allows longer cable lengths, since three conductor cable is readily available and relatively low in cost. Also using a programmable logic chip allows for a simple cost effective means of both serial data and display decoding.

We claim:

1. A laser beam detector system for grade elevation measurement, comprising an array of photodetectors usable in conjunction with a laser employed to define an elevation or grade as a base plane, said detector array being utilized on a substantially vertically disposed, elongate device having a plurality of faces, a plurality of detectors disposed in a consistently spaced arrangement on each of said faces, with the detectors of each face having a field of view different from the field of view of the detectors of the other faces, each detector on each face of said array being disposed at the same height as a corresponding detector on each of the other faces, with a designated detector on each face being representative of the base plane of the detector array, the distance each other detector on a given face of the array is spaced from the respective designated detector representing a particular position above or below the base plane, each group of detectors at the same height being electrically interconnected in a co-functioning group, means for detecting a laser beam incident on any detector of a co-functioning group, means for identifying the position of the detector in the array, upon which the laser beam has impinged, and means for displaying a readout indicative of the detector upon which the laser has impinged, said readout being in the form of a plainly visible representative character providing an indication of the position of the detector array above or below the base plane.

2. The laser beam detector system for grade elevation measurement as recited in claim 1 in which said array has three faces, with each group of detectors at the same height being electrically interconnected in a co-functioning group to form a triad arrangement.

3. The laser beam detector system for grade elevation measurement as recited in claim 2 in which an odd number of detectors is utilized on each face of said array, with a center detector being representative of the base plane of the detector array.

4. The laser beam detector system for grade elevation measurement as recited in claim 2 in which an odd number of detectors is utilized on each face of said array, with a center detector of a size smaller than the other detectors of the array being representative of the base plane of the detector array.

5. The laser beam detector system for grade elevation measurement as recited in claim 1 in which said array has four faces, with each group of detectors at the same height being electrically interconnected in a co-functioning group to form a quad type arrangement.

6. The laser beam detector system for grade elevation measurement as recited in claim 5 in which an odd number of detectors is utilized on each face of said array, with a center detector being representative of the base plane of the detector array.

7. The laser beam detector system for grade elevation measurement as recited in claim 5 in which an odd number of detectors is utilized on each face of said array, with a center detector of a size smaller than the other detectors of the array being representative of the base plane of the detector array.

8. The laser beam detector system for grade elevation measurement as recited in claim 1 in which said plainly visible character is an arabic numeral representative of the distance above or below a desired grade or level.

9. The laser beam detector system for grade elevation measurement as recited in claim 1 in which said means for identifying the position of the detector in the array upon which the laser beam has impinged is encoded for serial transmission to said readout utilized for displaying the desired information.

10. The laser beam detector system for grade elevation measurement as recited in claim 1 in which anti-saturation means are utilized in each co-functioning group for preventing one malfunctioning detector from interfering with the detection capability of the rest of the detectors of the co-functioning group.

11. A surveying device for use with a laser for measuring grade elevations or the like comprising:

at least one vertical array of spaced-apart detectors, each of said detectors being responsive to a beam from the laser, a designated detector on each vertical array being representative of the base plane of the detector array, the distance each other detector on said vertical array is spaced from the respective designated detector representing a particular position above or below the base plane, means for determining if a specific detector in said detector array has been energized by a laser beam, means for encoding the location of a determined detector in said array, and means for producing a digital display indicative of said location, whereby a relative grade location is defined with regard to the base plane.

12. The surveying device as recited in claim 11 in which said vertical array of detectors involves a three-sided device, with the detectors of a common level connected in a triad arrangement.

13. The surveying device as recited in claim 12 in which an odd number of detectors is utilized on each face of said array, with a center detector of a size smaller than the other detectors of the array being representative of the base plane of the detector array.

14. The surveying device as recited in claim 11 in which said vertical array of detectors involves a four-sided device, with the detectors of a common level connected in a quad arrangement.

15. The surveying device as recited in claim 14 in which an odd number of detectors is utilized on each face of said array, with a center detector of a size smaller than the other detectors of the array being representative of the base plane of the detector array.

16. The surveying device as recited in claim 11 in which said encoding means is co-located with said detector array, and said encoding means provides for serial transmission of the information indicative of the detector of the array upon which the laser has impinged.

17. The surveying device as recited in claim 11 in which said display means is located remote from said detector array.

18. The surveying device as recited in claim 17 in which said display means is connected by wire to said encoding means.

19. The surveying device as recited in claim 17 in which said display means is connected by radio to said encoding means.

20. The surveying device as recited in claim 11 in which a plurality of faces are utilized, and in which the detectors at each level in the several faces form a co-functioning group, and further in which anti-saturation means are utilized in each co-functioning group for preventing one malfunctioning detector from interfering with the detection capability of the rest of the detectors of the co-functioning group.

* * * * *